(12) United States Patent
Minamino et al.

(10) Patent No.: US 7,315,497 B2
(45) Date of Patent: Jan. 1, 2008

(54) METHOD AND AN APPARATUS FOR REPRODUCING INFORMATION BASED ON REFERENCE WOBBLE BLOCK AND AN INFORMATION WOBBLE BLOCK ON AN INFORMATION RECORDING MEDIUM

(75) Inventors: Junichi Minamino, Nara (JP); Masahito Nakao, Osaka (JP); Shigeru Furumiya, Hyogo (JP); Hiromichi Ishibashi, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 498 days.

(21) Appl. No.: 10/300,853

(22) Filed: Nov. 21, 2002

(65) Prior Publication Data

US 2003/0117915 A1    Jun. 26, 2003

(30) Foreign Application Priority Data

Nov. 21, 2001    (JP)    ............................. 2001-356086

(51) Int. Cl.
*G11B 7/00*    (2006.01)
(52) U.S. Cl. .................................................. 369/47.22
(58) Field of Classification Search ............. 369/47.22; 428/64.1
See application file for complete search history.

(56) References Cited

U.S. PATENT DOCUMENTS

| | | | |
|---|---|---|---|
| 5,699,342 A | 12/1997 | Yagi et al. | |
| 5,754,505 A | 5/1998 | Saeki | |
| 6,075,761 A | 6/2000 | Akiyama et al. | |
| 6,081,490 A | 6/2000 | Kuroda et al. | |
| 6,181,658 B1 * | 1/2001 | Van Den Enden et al. | 369/59.25 |
| 6,335,070 B1 * | 1/2002 | Tomita | 428/64.1 |
| 6,608,810 B2 * | 8/2003 | Minamino et al. | 369/275.4 |
| 6,724,708 B2 * | 4/2004 | Ishibashi et al. | 369/59.25 |
| 6,791,920 B1 | 9/2004 | Ko et al. | |
| 6,813,230 B1 * | 11/2004 | Ko et al. | 369/47.1 |
| 2003/0012123 A1 | 1/2003 | Miyamoto et al. | |
| 2004/0100887 A1 * | 5/2004 | Ueda | 369/53.14 |

FOREIGN PATENT DOCUMENTS

| | | |
|---|---|---|
| EP | 1271489 | 1/2003 |
| JP | 5-189934 | 7/1993 |

(Continued)

*Primary Examiner*—Guatam R. Patel
(74) *Attorney, Agent, or Firm*—Wenderoth, Lind & Ponack, L.L.P.

(57) ABSTRACT

At the time of heterodyne detection, information is reproduced constantly in the optimum condition. A method reproduces information recording medium including a reference wobble block which has a first wobble pattern representing a first information content; and an information wobble block which follows the reference wobble block and which has at least one of the first wobble pattern and a second wobble pattern representing a second information and different from the first wobble pattern. The method includes reading the reference wobble block and the information wobble block; comparing a wobble pattern read from the information wobble block with the first wobble pattern of the reference wobble block; judging that information recorded in the information wobble block is the first information or the second information according to the wobble pattern read from the information wobble block; and outputting one of the first and the second information based on the judging result.

7 Claims, 9 Drawing Sheets

FOREIGN PATENT DOCUMENTS

| | | |
|---|---|---|
| JP | 6-309672 | 11/1994 |
| JP | 9-326138 | 12/1997 |
| JP | 10-69646 | 3/1998 |
| JP | 10-293926 | 11/1998 |
| JP | 11-283280 | 10/1999 |
| KR | 2001-0049237 | 6/2001 |
| WO | 03/034415 | 4/2003 |

\* cited by examiner

METHOD AND AN APPARATUS FOR REPRODUCING INFORMATION BASED ON REFERENCE WOBBLE BLOCK AND AN INFORMATION WOBBLE BLOCK ON AN INFORMATION RECORDING MEDIUM

BACKGROUND OF THE INVENTION

1. Field of the Invention

The present invention relates to reproduction of information from a storage medium, in which digital video information and other information can be recorded at high density. More specifically, the present invention relates to a technique for reproducing information from a high-density optical disc medium with information contained in track wobbles.

2. Description of Related Art

In recent years, optical disc media continue to increase in density. In general, in a recordable optical disc medium, track grooves are preformed. Information is recorded along each of the track grooves, that is, on the track groove or an area in-between track grooves (so-called "land"). Each of the track grooves is formed as a wave-like wobble such as a sine wave. Information is recorded in synchronization with clocks generated according to the wobble period. In addition, in order to record information in a specified position of the optical disc recording surface, addresses are provided along the track grooves. Configuration of addresses will be described as follows with examples given.

First of all, the first example, Japanese Laid-open Patent Publication No. 6-309672, is a technique to form local and intermittent track grooves with wobbles pre-formed and make them reproducible as so-called pre-pits. This technique adopts a configuration in which address-dedicated area and data-dedicated area (for recording information) coexist. The second example, Japanese Laid-open Patent Publication No. 5-189934 is a technique for frequency-modulating wobbles and describing address information, that is, sub-information. According to this technique, data information is overwritten onto address information. Furthermore, the third example, Japanese Laid-open Patent Publication No. 9-326138, is a technique to form pre-pits between track grooves adjacent to each other to form addresses.

However, when taking still more increased density that would occur in the future into account, all of the above techniques have problems, respectively. First of all, in the configuration according to the first example, the data area is reduced by the address area to be secured (so-called, overhead) and thus, recording capacity must be reduced.

Next, with respect to the second example, first of all, groove wobble primarily aims at generating clocks of recorded information and it is desirable that groove wobble is formed by a single frequency. Because a high-accuracy recording clock signal can be generated by simply synchronously multiplying the wobble reproduction signal with a single frequency, by using phase locked loop (PLL), etc. However, in the case groove wobble contains a plurality of frequency components, PLL tracking band must be lowered as compared to the case of the wobble with a single frequency in order to avoid pseudo-lock of the phase locked loop. Accordingly, phase locked loop cannot satisfactorily follow disc motor jitter or jitter generated by disc eccentricity, and as a result, jitter may remain in the recorded signal. In addition, if a recorded film formed on an optical disc recording surface is, for example, a phase-changed film, an S/N ratio of the recorded film may be lowered while rewriting is repeated. Even if the S/N ratio is lowered, noise components can be eliminated using a bandpass filter of narrow band when the groove wobble is generated with a single wobble frequency.

However, if groove wobble is frequency-demodulated and contains a plurality of frequencies, the filter band must be expanded for the frequencies. This would cause noise components to be mixed and further aggravates the jitter. From the perspective that jitter margin decreases as the recording density increases, this kind of jitter increase is not desirable.

Next, with the third example, because pre-pits naturally exert influence on adjacent tracks, it is difficult to make the pre-pit length sufficiently long or the quantity sufficiently large. In particular, for increased density, there is a fear of increasing detection errors.

In view of the above problems, the present applicant proposes an optical disc medium that gives information with a wobble form with sharp displacement toward inner periphery assigned to "1" and a wobble form with sharp displacement toward outer periphery assigned to "0" to mark an address. As one means for detecting the address information of the above-mentioned optical disc medium, there is a method for generating a carrier of wobble frequency, for example, the second harmonic, multiplying and integrating it to reproduction signals, and judging "1" or "0" by the sign. This is a technique to carry out heterodyne detection on the second harmonic contained in the reproduction signal by using the fact that waveforms with different gradients in rising or falling are attributed to the difference of phase polarity of even harmonics. The second harmonic for multiplication can be easily generated in the PLL by 2N-multiplying a frequency of the wobbles to first generate multiplied clocks, and then by N-demultiplying the multiplied clocks, for example (N is a rational number).

However, in the event that a reference wave of the second harmonic is generated by the clocks with wobble signals multiplied as described above, the detection sensitivity by heterodyne detection may lower. This is because phase of wobbles shifts due to interference of adjacent track wobbles to cause phase deviation with respect to the second harmonic in the signals to be detected.

SUMMARY OF THE INVENTION

It is an object of the present invention to reproduce information constantly in the optimum condition at the time of heterodyne detection. To be more specific, it is an object of the present invention to generate a second harmonic carrier signal for heterodyne detection.

The present invention is applicable to reproduce an information recording medium which includes a reference wobble block which has a first wobble pattern representing a first information content; and an information wobble block which follows the reference wobble block and which has at least one of the first wobble pattern and a second wobble pattern representing a second information and different from the first wobble pattern.

More specifically, a method according to the present invention includes: reading the reference wobble block; reading the information wobble block; comparing a wobble pattern read from the information wobble block with the first wobble pattern of the reference wobble block; judging that information recorded in the information wobble block is identical with the first information, in the case the wobble pattern read from the information wobble block coincides with the first wobble pattern, and judging that information recorded in the information wobble block is the second information in the case the wobble pattern read from the information wobble block is different from the first wobble pattern; and outputting one of the first information and the second information based on a result of the judging. According to the method of the present invention, the above object can be achieved.

In addition, an apparatus of the present invention has a head which reads the reference wobble block and the information wobble block, and an information detection circuit which outputs information recorded in the information wobble block. The information detection circuit includes a heterodyne detector which heterodyne-detects a wobble pattern of the information wobble block and the first wobble pattern of the reference wobble block read by the head, and a binarizing circuit that performs: judging that information recorded in the information wobble block is identical with the first information, in the case the wobble pattern read from the information wobble block coincides with the first wobble pattern; judging that information recorded in the information wobble block is the second information in the case the wobble pattern read from the information wobble block is different from the first wobble pattern; and outputting one of the first information and the second information.

According to the present invention, in the event of reproducing information from an optical disc, in which the information is provided based on phases of harmonics, a harmonic carrier is generated in the phase condition during a predetermined reference wobble period and is used for detection. According to this configuration, heterodyne detection is carried out constantly in the optimum condition and the information can be reproduced, even when phase shift of wobble clock is occurred due to interference of adjacent tracks.

BRIEF DESCRIPTION OF THE DRAWINGS

The above and other objects and features of the present invention will become clear from the subsequent description of a preferred embodiment thereof made with reference to the accompanying drawings, in which like parts are designated by like reference numerals and in which.

DETAILED DESCRIPTION OF THE PREFERRED EMBODIMENTS

Before describing embodiments according to the present invention, one example of an optical disc medium to which the present invention is applied will be first explained. In the present specification, like reference characters designate like or corresponding elements which have similar configurations and carry the similar operations.

Figure 1:
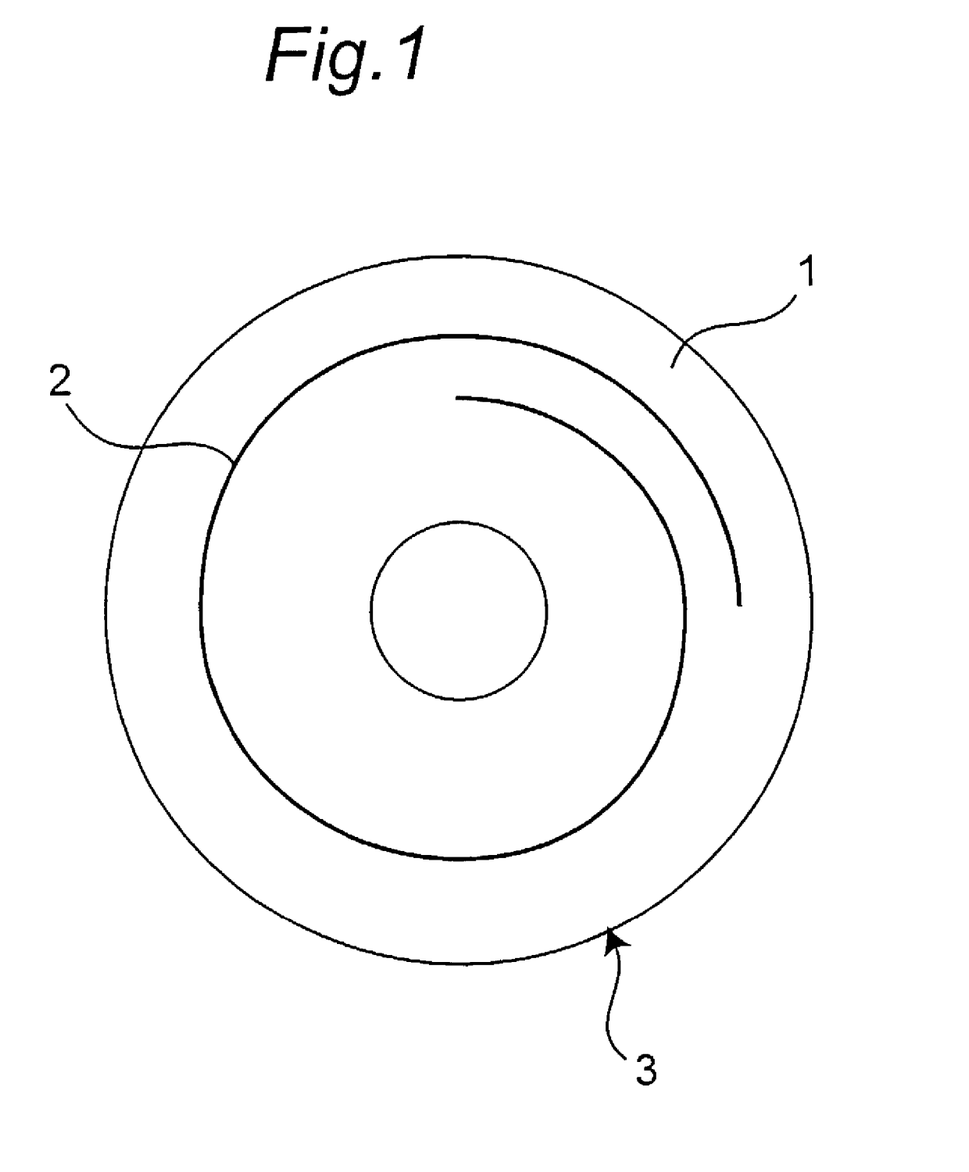
FIG. 1 is a top view of an information recording medium.

FIG. 1 is a top view of information recording medium 3. Information recording medium 3 is an optical disc such as a DVD. On recording surface 1 of information recording medium 3, track groove 2 is formed in a spiral form. In information recording medium 3, information is recorded along the track groove. In the figure, track 2 is drawn in an extremely large size, but the track pitch of track 2 is, for example, 0.32 μm.

Figure 2:
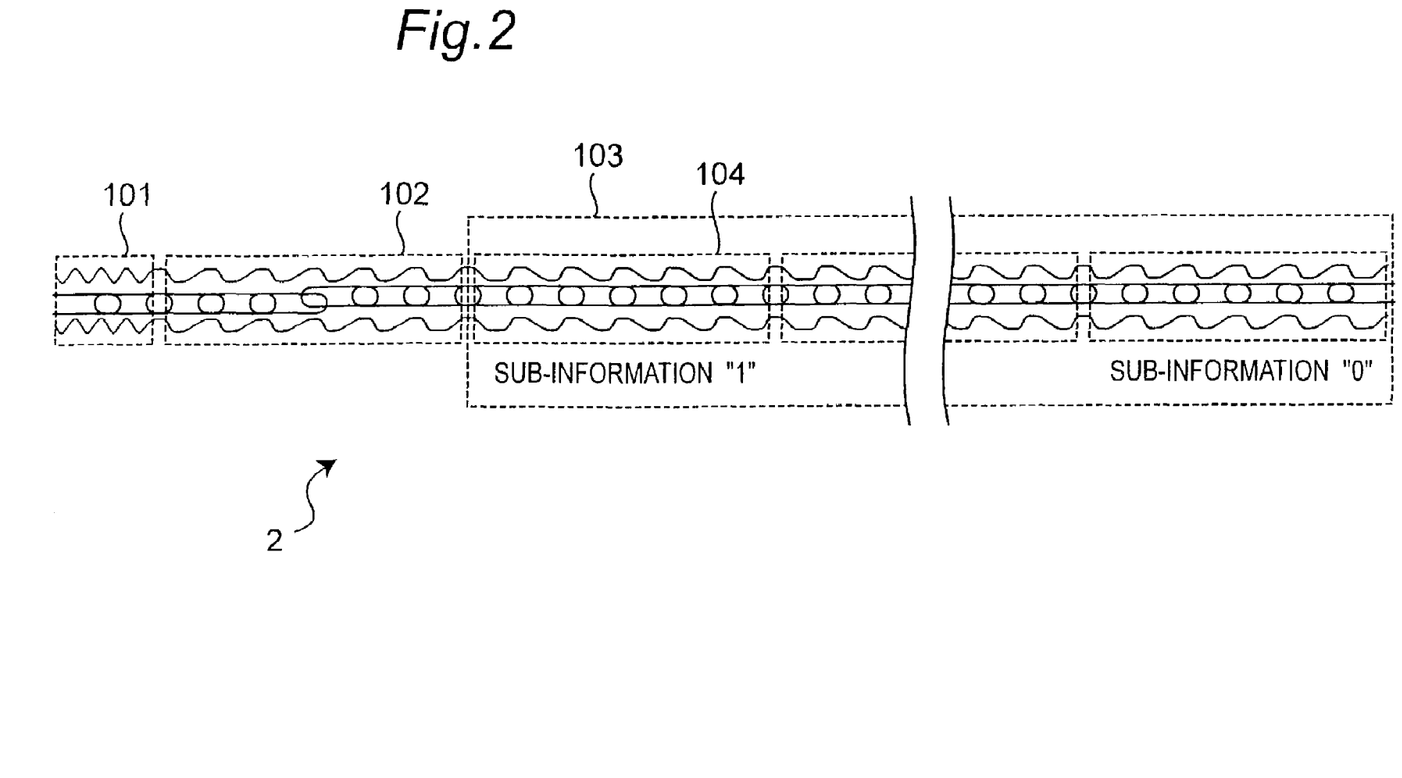
FIG. 2 is a schematic view showing the configuration of a substantial part of a track groove.

FIG. 2 is a schematic view showing the configuration of a substantial part of track groove 2. Track groove 2 is divided into a plurality of blocks, with block mark 101 at the lead, followed by reference wobble block 102, and then, sub-information wobble block 103. Sub-information wobble block 103 contains a plurality of unit block 104 with the predetermined-length set as one unit.

As clear from the figure, the majority of track grooves 2 is periodically wobbled. To each of reference wobble block 102, and unit block 104 composing sub-information wobble block 103, wobble forms are continuously provided. Each of blocks 101, 102, and 103 will be described hereinafter.

Block mark 101 is also called an identification mark and serves as an index for identifying the block head position. The wobble period of block mark 101 is shorter than wobble periods of other blocks. Therefore, the area from which a short period is detected can be identified as block mark 101. Next, reference wobble block 102 is used as a reference for identifying the information ("0" or "1") which the wobble form of subsequent unit block 104 indicates.

Sub-information wobble block 103 is formed on the basis of information related to a physical address of information recording medium 3 (FIG. 1), for example, information with an address provided with scramble, interleave, and error correction signs added.

Unit block 104 that composes sub-information wobble block 103 uniquely indicates one-bit information of "0" or "1" (hereinafter called "sub-information") in accordance with the wobble form. In other words, to unit block 104, a wobble form that indicates sub-information "0" or a wobble form that indicates sub-information "1" is given. In accordance with the number of unit blocks 104, the amount of information (bit numbers) that one sub-information wobble block 103 can indicate can be adjusted. For example, by setting up four unit blocks 104, sub-information wobble block 103 can indicate 4-bit information. Alternatively, a plurality of unit block 104 of the same wobble form can be continuously set up and n-bit information may be expressed by (n+1) or more pieces of unit blocks 104. According to this configuration, information related to the address described above can be identified even when a specific unit block 104 is unable to be read.

In the event that one sub-information wobble block 103 indicates 4-bit information and the address-related information uses 60 bits as one information processing unit, 15 sets of a set including block mark 101, reference wobble block 102, and sub-information wobble block 103 described above should be prepared.

Next, the wobble form that indicates the sub-information will be more specifically described. FIG. 2 shows a wobble form that indicates sub-information "1" and a wobble form that indicates sub-information "0." As understood from the figure, both the wobble form that indicates sub-information "1" and the wobble form that indicates sub-information "0" are formed in a so-called saw-tooth waveform. The wobble form that indicates sub-information "1" is configured in such a manner that a displacement towards inner periphery of information recording medium 3 is sharp and at the same time a displacement towards outer periphery is gradual. On the other hand, the wobble form that indicates sub-information "0" is configured in such a manner that a displacement towards inner periphery of information recording medium 3 is gradual and at the same time a displacement towards outer periphery is sharp. "Towards inner periphery" referred to here means the upward direction with block 101 to be located at the left end in FIG. 2 and "towards outer periphery" indicates the opposite direction.

The two kinds of wobble forms in the above-mentioned relationship can be formed as follows. That is, when one wobble form is expressed as Fourier series using first fundamental wave ($\sin(\omega_0 t)$) and nth harmonics ($\sin(n\omega_0 t)$), by reversing the polarity of even harmonics, the other wobble wave form can be formed. This "reversing the polarity of even harmonics" means to reverse positive and negative of Fourier series of even harmonics, in other words, to reverse positive and negative of the waveform itself of even harmonics, or to shift the phase by a half period.

In the present specification, the wobble form of reference wobble block 102 is the same as that of unit block 104 which has sub-information "0." A reproduction apparatus of information recording medium 3 later discussed relatively compares the wobble form of reference wobble block 102 with that of unit section 104 and if it detects that the wobble form of unit section 104 is the same as that of reference wobble, the apparatus identifies that unit block 104 represents sub-information "0." Similarly, if the apparatus detects that the wobble form of unit block 104 is different from that of reference wobble (that is, a form with polarity reversed), the apparatus identifies that unit block 104 represents sub-information "1." The reproduction apparatus has it set in advance that block mark 101, reference wobble block 102, and sub-information wobble block 103 are arranged in this order on information recording medium 3 in order to carry out this processing.

In the above-mentioned description, it is explained that the wobble period of block mark 101 is shorter than that of other blocks. However, for example, the period may be the same and the phase may be reversed. A wobble with short period may be combined with a wobble with the phase reversed.

In the above-mentioned description, it was assumed that wobble forms are continuously set up in a plurality of unit block 104 of reference wobble block 102 and sub-information wobble block 103, but they may not be necessarily continuously set up if the position inside the block can be identified.

In addition, reference wobble block 102 is located in the vicinity of the head of track groove 2 in one section, but for example, it may be assumed that reference wobble block 102 is configured by one unit section of the same length as unit block 104, and a plurality of sections may be located in a block, such as reference wobble block 102 being located at the headmost one unit section and sub-information wobble block at subsequent 4 unit sections for every 5 unit sections.

Referring now to the drawings attached, preferred embodiments of an optical disc reproduction apparatus according to the present invention will be described as follows. Information recording medium 3 described above is assumed to be an optical disc, such as a DVD.

The First Embodiment

Figure 3:
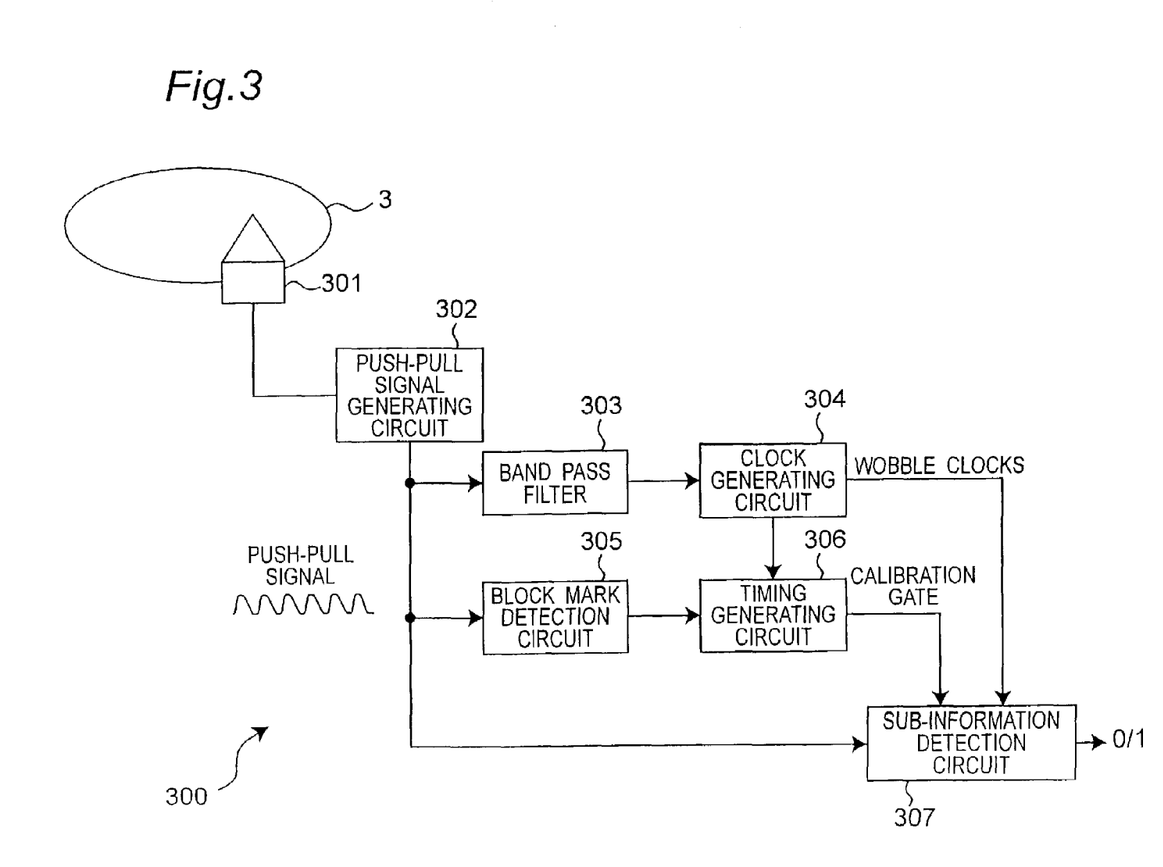
FIG. 3 is a block diagram showing a configuration of a detecting section for detecting sub-information on an optical disc.

FIG. 3 is a block diagram showing a configuration of detection section 300 which detects the sub-information on optical disc 3. Because detection section 300 is mounted to an optical disc reproduction apparatus, the configuration shown in FIG. 3 is part of an optical disc reproduction apparatus. Note that, other sections included in the optical disc reproduction apparatus which are necessary for processing after detecting the sub-information by detection section 300 are not directly related to the present invention. Consequently, the whole optical disc reproduction apparatus is not illustrated.

Detection section 300 of optical disc reproduction apparatus has optical head 301, push-pull signal generating circuit 302, bandpass filter 303, clock generating circuit 304, block mark detection circuit 305, timing generating circuit 306, and sub-information detection circuit 307. For reference, in the diagram, optical disc 3 is also illustrated.

Detection section 300 detects a wobble form provided on track groove 2 (FIG. 2) of information recording medium 3 described above and identifies the contents of the sub-information which the wobble form represents. More specifically, detection section 300 reads specified sets of block mark 101, reference wobble block 102, and sub-information wobble block 103 of optical disc 3 described above, and identifies the position of block mark 101, starting position and ending position of reference wobble block 102, position of unit block 104, main carrier frequency of unit block 104, etc. Thereafter, detection section 300 reads these blocks again and identifies the contents of the sub-information which the wobble form represents.

Now, each component is specifically described. Optical head 301 irradiates optical disc 3 with a laser beam and detects the reflected beam. A beam spot of the laser beam is focused on and kept tracking the grooves of optical disc 3 based on a control from a servo circuit (not illustrated). Optical head 301 detects the reflected beam at two light receiving elements (not illustrated) divided into the direction orthogonal to the track (radial direction) and outputs a signal from the two light receiving elements, respectively.

Push-pull signal generating circuit 302 carries out subtraction processing for the two signals outputted from optical head 301 and outputs electric signals corresponding to track groove wobbles as push-pull signals. The push-pull signal includes a main carrier, which has a frequency corresponding to a wobble period. Rising displacement of the push-pull signal corresponds to the displacement toward the inner periphery of the wobble form on optical disc 3 and the falling displacement corresponds to the displacement toward the outer periphery. Bandpass filter 303 only extracts the main carrier contained in the push-pull signal to output to clock generating circuit 304.

Clock generating circuit 304 includes a binarizing circuit, a demultiplying circuit and a PLL circuit. The binarizing circuit binarizes the main carrier. The demultiplying circuit demultiplies or divides a frequency of given clocks into 1/69. Clock generating circuit 304 generates clocks that synchronize a binary signal of the main carrier with a demultiplied signal. The clocks have a frequency that is 69 times higher than that of the main carrier by the multiplying operation of the demultiplying circuit. The clocks are hereinafter called "wobble clocks". The wobble clocks are used as reference clocks for generating, for example, recording signals or reference clocks for generating timing. In the present embodiment, these wobble clocks are used as reference clocks used for detecting the sub-information in sub-information detection circuit 307.

Block mark detection circuit 305 detects block mark 101 (FIG. 2) which appears at a frequency different from the main carrier and identifies the block headmost position. Timing generating circuit 306 generates various kinds of timing signals as gate signals required by counting the above-mentioned wobble clocks from the block headmost position identified by block mark detection circuit 305. The figure indicates that the calibration gate signal used for calibrating the second harmonic later discussed is outputted to sub-information detection circuit 307. The calibration gate signal reaches high level at the timing in which reproduction of reference wobble block 102 (FIG. 2) begins and reaches low level at the timing in which the reproduction is completed.

Sub-information detection circuit 307 outputs the sub-information represented by each unit block 104 of optical disc 3 based on the push-pull signal, wobble clocks generated by clock generating circuit 304, and the gate signals generated by timing generating circuit 306. Sub-information detection circuit 307 carries out calibration during a period of reference wobble block 102 (FIG. 2), and can detect the sub-information of subsequent unit block 104. Therefore, detection of the sub-information can be constantly achieved in an optimum condition.

Figure 4:
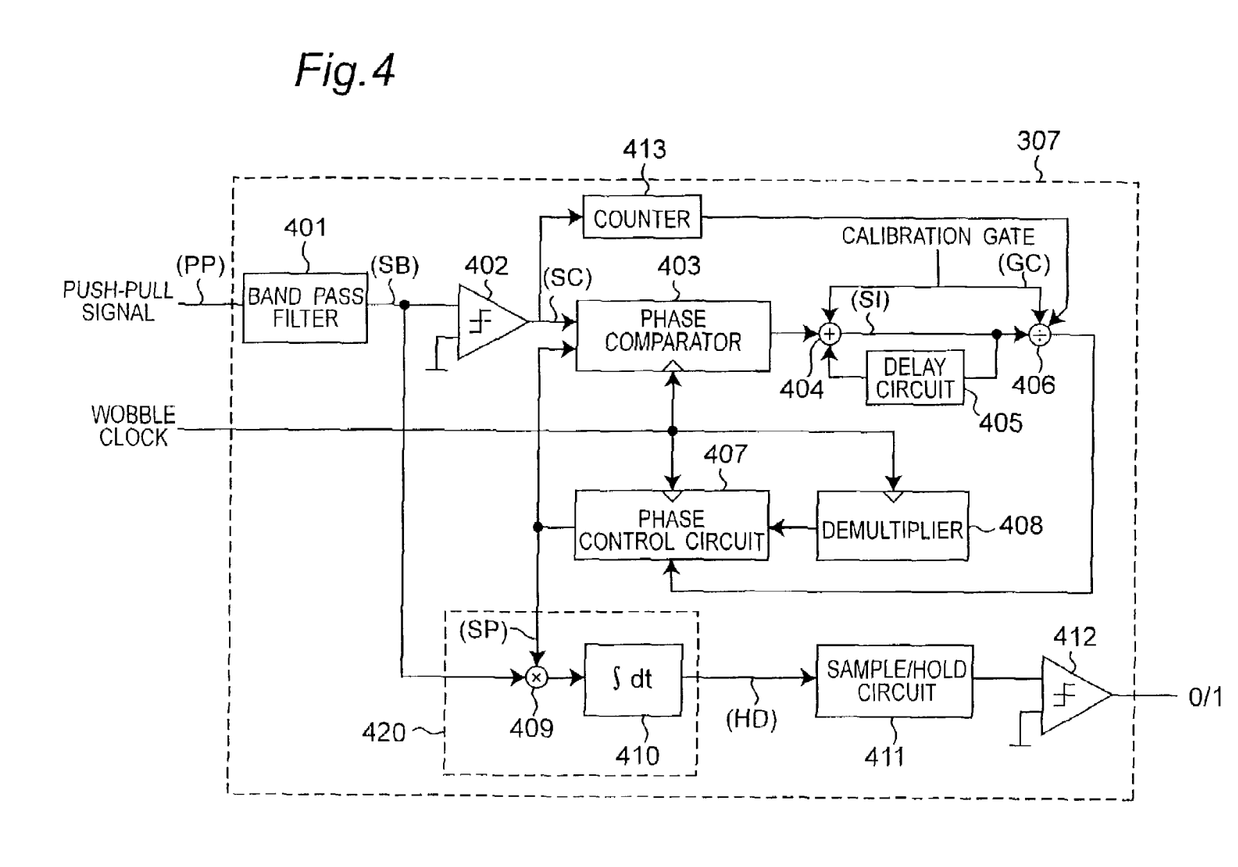
FIG. 4 is a block diagram showing a configuration of a sub-information detection circuit.
Figure 5:
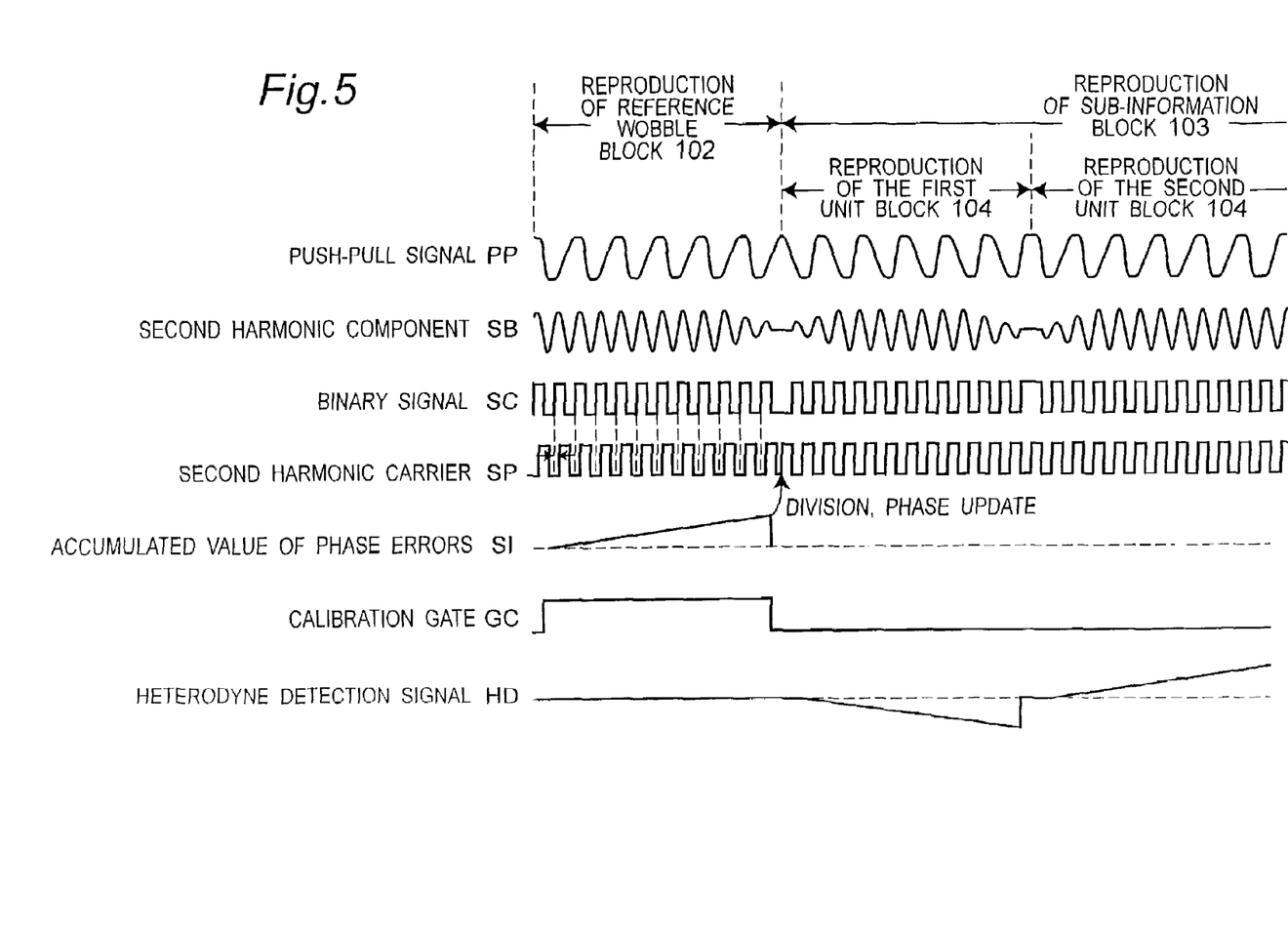
FIG. 5 is a diagram showing signal waveforms of each section utilized and generated in the sub-information detection circuit.
Figure 6:
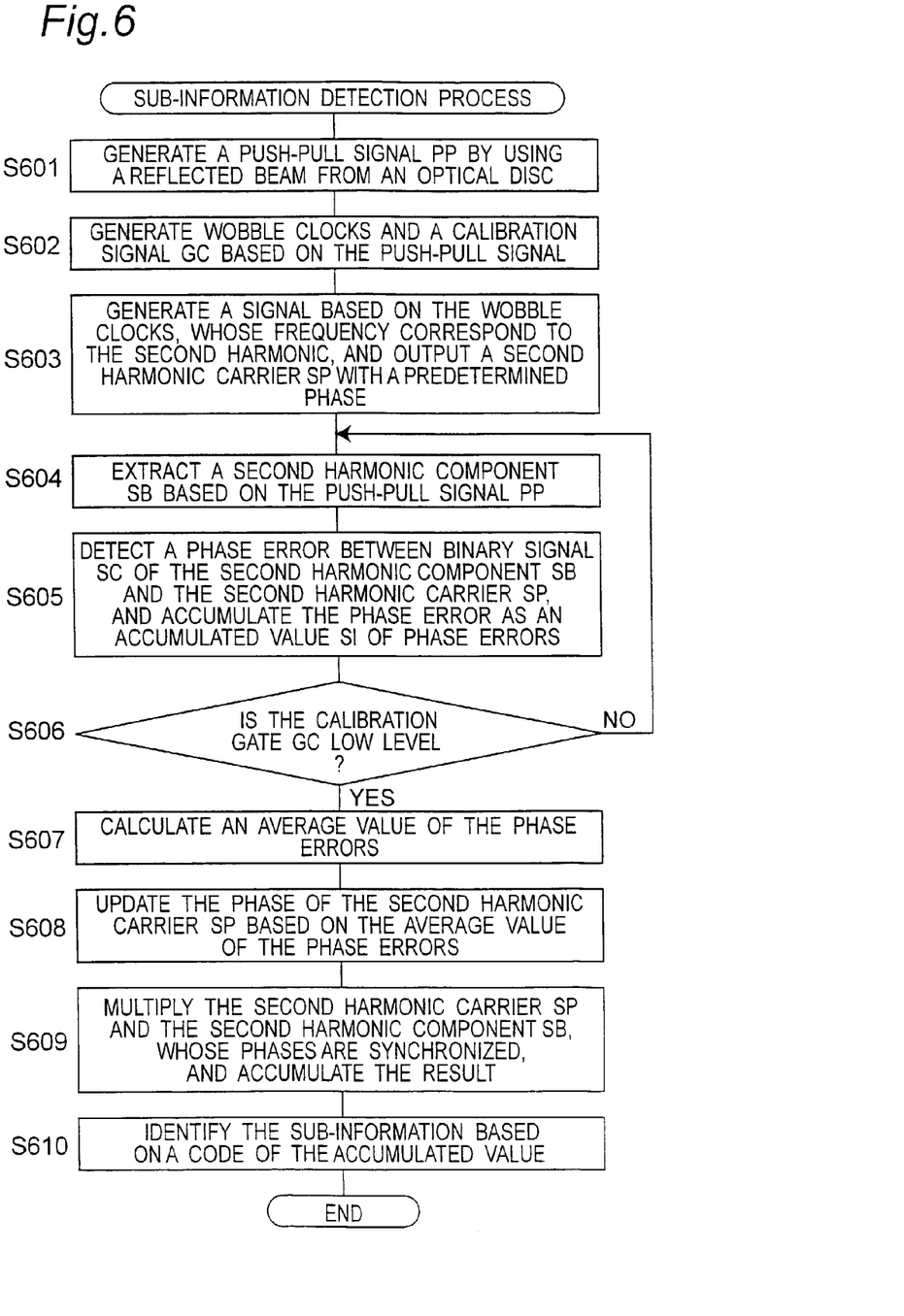
FIG. 6 is a flow chart showing the procedure of sub-information detection processing by the sub-information detection circuit.

Referring now to FIGS. 4 through 6, sub-information detection circuit 307 will be described in detail. In sub-information detection circuit 307, the second harmonic component of push-pull signal PP primarily is dealt for processing. The reason is that sub-information "0" and "1" detected by sub-information detection circuit 307 are expressed by two types of wobble forms of unit block 104 (FIG. 2) as described above, and the difference of the wobble waveforms can be judged on the basis of difference of polarity of even harmonics. Therefore, the second harmonic is used as one of the even harmonics.

FIG. 4 is a block diagram showing a configuration of sub-information detection circuit 307. FIG. 5 is a diagram showing signal waveforms of each section used and generated at sub-information detection circuit 307. Referring now to FIG. 4, sub-information detection circuit 307 includes bandpass filter 401, binarizing circuit 402, phase comparator 403, adder 404, delay circuit 405, divider 406, phase control circuit 407, demultiplier 408, multiplier 409, integrator 410, sample/hold circuit 411, binarizing circuit 412, and counter 413.

Now description will be made on each component of sub-information detection circuit 307. First of all, bandpass filter 401 extracts the second harmonic SB from push-pull signal PP. Binarizing circuit 402 converts the second harmonic component SB into a digital signal with phase information of the second harmonic component and outputs binary signal SC. That is, binarizing circuit 402 outputs binary signal SC of the same phase as that of the second harmonic component. Phase comparator 403 detects phase error of two signals entered and outputs phase error information. Adder 404 adds phase error information to an accumulated value of previous phase errors and outputs a new accumulated value of phase errors. Delay circuit 405 holds the accumulated value of phase errors and outputs as an accumulated value of previous phase errors. Divider 406 divides the accumulated value of phase errors by a counter value that indicates a period of accumulating phase errors and outputs an average of phase errors. Counter 413 counts clock numbers and holds as a counter value.

Demultiplier 408 demultiplies wobble clocks by 34.5, which are generated by multiplying a wobble period by 69, and generates a signal corresponding to the second harmonic. Phase control circuit 407 changes the phase of the signal equivalent to the second harmonic based on a phase value separately entered (in this case, average of phase errors). This processing is called calibration. Phase control circuit 407 outputs calibrated second harmonic carrier SP. Multiplier 409 multiplies the second harmonic SB by the second harmonic carrier SP and outputs the result. Integrator 410 accumulates input values. Multiplier 409 and integrator 410 are called heterodyne detector 420 and its processing is so-called heterodyne detection. Integrator 410 outputs heterodyne detection signal HD. Sample/hold circuit 411 holds heterodyne detection signal HD. Binarizing circuit 412 judges the sign of the entered value and outputs as "0" or "1" sub-information.

Now description is made on processing of sub-information detection circuit 307 carried out by each of the above-mentioned elements. FIG. 6 is a flow chart of sub-information detection processing by sub-information detection circuit 307 (FIG. 3). As described before, as a premise, push-pull signal generating circuit 302 (FIG. 3) has already generated push-pull signal PP from the reflected beam of optical disc 3 (Step S601). In addition, based on push-pull signal PP, clock generating circuit 304 (FIG. 3) has generated wobble clocks and timing generating circuit 306 (FIG. 3) has generated a calibration gate signal (Step S602).

First of all, based on the wobble clocks entered in sub-information detection circuit 307, demultiplier 408 generates a signal that has a frequency equivalent to the second harmonic. Phase control circuit 407 gives a specified phase to the generated signal and outputs the second harmonic carrier SP (Step S603). The initial value of the phase given should have a phase same as, for example, that of the demultiplied signal of the wobble clocks possessed in clock generating circuit 304 (FIG. 3) discussed previously.

When timing to start reproduction of reference wobble block 102 (FIG. 2) is reached, calibration gate GC generated by timing generating circuit 306 (FIG. 3) rises and phase calibration of the second harmonic carrier begins to take place.

Bandpass filter 401 extracts the second harmonic component SB based on push-pull signal PP entered into sub-information detection circuit 307 (Step S604). Binarizing circuit 402 converts the second harmonic component SB extracted by bandpass filter 401 into binary signal SC that has phase information and outputs.

Phase comparator 403 detects a phase error between binary signal SC and the second harmonic carrier SP and outputs phase error information. Adder 404 accumulates and adds the phase error represented by the phase error information and accumulated value of previous phase errors from delay circuit 405 for each edge of clocks and outputs an accumulated value SI of phase errors (Step S605). This accumulated value SI is held in delay circuit 405 again. This processing is continued while calibration gate GC is in a high level condition, in other words, this processing is continued until calibration gate GC becomes a low level (Step S606). As shown in FIG. 5, calibration gate GC is generally at a high level while reference wobble block 102 is being reproduced. It is understood that while calibration gate GC is at a high level, the accumulated value SI is integrated and is gradually increased.

Referring now to FIG. 6 again, when calibration gate GC falls to reach a low level ("YES" of Step S606), accumulation adding processing is ended. Divider 406 divides the accumulated value SI of the phase errors by a counter value which counter 413 holds, calculates an average of phase errors, and outputs (Step S607).

Phase control circuit 407 updates the phase of the second harmonic carrier SP based on the average (average phase error) of phase errors outputted from divider 406 (S608). For example, assume that the average phase error is +3 clocks; then, phase control circuit 407 advances the phase of the second harmonic carrier SP by 3 clocks. According to this processing, the phase of the second harmonic carrier SP entered into phase comparator 403 again can be aligned with the phase of binary signal SC. Note that, "aligning phases" means to align phases of, for example, rising edges of two signals. Consequently, the second harmonic carrier SP and binary signal SC have the same phase or the opposite phase. As described above, binary signal SC has the same phase as the second harmonic component SB extracted from push-pull signal PP. Consequently, the second harmonic carrier SP with the phase updated based on the average phase error has the phase aligned with the second harmonic component SB.

Subsequently, the second harmonic carrier SP and the second harmonic component SB obtained as above are heterodyne-detected. Specifically, multiplier 409 multiplies the second harmonic carrier SP by the second harmonic component SB. Subject for multiplication is a wobble signal containing the sub-information. This is because when phases of two signals are aligned, the period of reading reference wobble block 102 (FIG. 2) is ended and the period of reading sub-information wobble block 103 (FIG. 2) into unit block 104 begins. Integrator 410 integrates multiplication results and outputs a heterodyne detection signal HD (Step S609). Referring now to FIG. 5, this processing is described more specifically. Because the second harmonic component SB and the second harmonic carrier SP have opposite phases at the time of reproducing the first unit block 104, the multiplied value becomes negative. Consequently, as reproduction of the first unit block 104 takes place, heterodyne detection signal HD leans to the negative direction. When reproduction of the block is terminated, heterodyne detection signal HD is reset. Because the second harmonic component SB and the second harmonic carrier SP are of the same phase when the second unit block 104 is reproduced, the multiplier value becomes positive. Consequently, the heterodyne detection signal HD leans to the positive direction.

Referring now to FIG. 6 again, sample/hold circuit 411 holds heterodyne detection signal HD, judges the sign by binarizing circuit 412, and outputs either value "0" or "1". For example, binarizing circuit 412 outputs 0 when the held heterodyne detection signal HD is positive and 1 when it is negative (Step S610).

For the correspondence relationship between the signs and the output values, the reproduction waveform of reference wobble block 102 is used. That is, when the reproduction waveform of unit block 104 coincides with the reproduction waveform of reference wobble block 102, the value which sample/hold circuit 411 holds becomes positive. Consequently, in such event, processing is made in such a manner that binarizing circuit 412 homologizes to "0", the same value which reference wobble block 102 represents. Conversely, in the event that the reproduction waveform of unit block 104 differs from or does not coincide with the reproduction waveform of reference wobble block 102, the value which sample/hold circuit 411 holds becomes negative. Consequently, processing is made in such a manner that binarizing circuit 412 homologizes to "1." This processing is practically the same as the processing in which unit block 104 expresses sub-information "0" when the wobble form of unit section 104 is detected to be the same as that of reference wobble, and unit block 104 expresses sub-information "1" when the wobble form of unit block 104 is different from that of reference wobble by relatively comparing wobble form of reference wobble block 102 with the wobble form of unit section 104. By detecting the sub-information in sub-information wobble using reference wobble in this way, it becomes possible to detect the sub-information constantly in an optimum condition even if there is any phase deviation of wobble clocks due to cross talk.

In the present embodiment, detection of the sub-information is carried out by using the detected phase information as it is, but an effect of low pass filter may be added to the detection result by using the value added at a specified ratio of current phase to the phase detected by reference wobble.

Figure 7A:
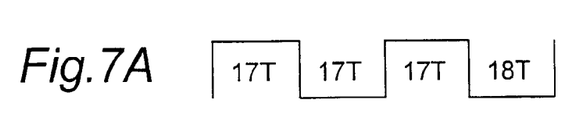
FIG. 7A is a diagram showing clock waveforms in which the length of "H" section and that of "L" section are asymmetrical.
Figure 8:
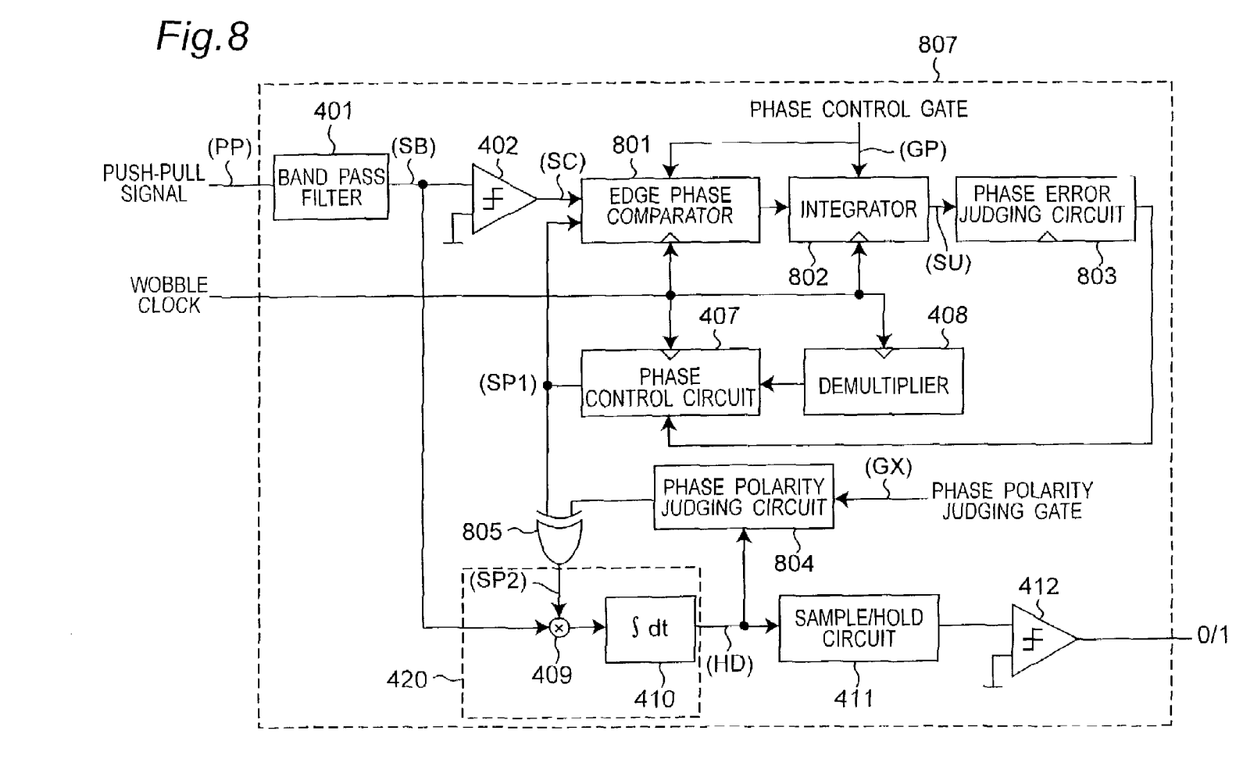
FIG. 8 is a block diagram showing a configuration of a sub-information detection circuit according to Embodiment 2.

Now description will be made on the processing of demultiplier 408 (FIG. 8). When the wobble clocks generated by clock generating circuit 304 (FIG. 3) is exactly equivalent to a multiple of 4 of wobble frequency, there is no problem in that demultiplier 408 generates the second harmonic by demultiplication. However, to the contrary, for example, in the case of 69 times, problems occur. FIG. 7A is a diagram showing a clock waveform of asymmetrical length of section "H" and section "L." When demultiplier 408 generates the second harmonic using wobble clocks, as shown in FIG. 7A, the lengths of section "H" and section "L" differ as per 17T section "H", 17T section "L", 17T section "H", 18T section "L", where T is a wobble clock period. When phase comparison or heterodyne detection are carried out by using this kind of asymmetrical waveform, detection error occurs. However, since wobble clocks are generally used for recording clocks, too, it cannot make the multiplication ratio of wobble clocks a multiple of 4.

Figure 7B:
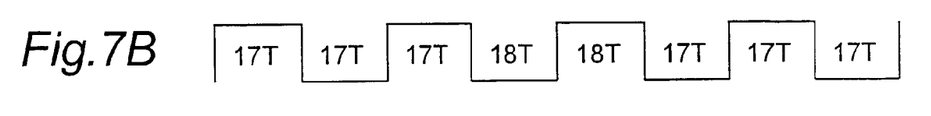
FIG. 7B is a diagram showing clock waveforms that offset asymmetricalness between length of "H" section and that of "L" section of clock waveform.

FIG. 7B is a diagram showing a clock waveform that offsets the asymmetricalness of lengths of clock waveform section "H" and section "L." In order to avoid detection errors, the second harmonic are generated enough for four periods and the above asymmetricalness should be offset at precedent two periods and succeeding two periods. According to this contrivance, errors of phase detection or heterodyne detection can be comprehensively eliminated.

As described above, according to the optical disc reproduction apparatus according to the present embodiment, even when wobble clock phase shift caused by interference of adjacent tracks occurs, heterodyne detection can be carried out constantly in the optimum condition and the sub-information can be reproduced.

The Second Embodiment

Next description will be made on an optical disc reproduction apparatus according to the second embodiment. Configuration and operation of an optical disc reproduction apparatus according to the second embodiment are the same as those of optical disc reproduction apparatus (FIG. 3) according to the first embodiment, except for sub-information detection circuit 807 shown in FIG. 8 installed in place of sub-information detection circuit 307 (FIG. 3). Consequently, in the remainder of this section, components and operation of sub-information detection circuit 807 according to the second embodiment will be described.

Figure 9:
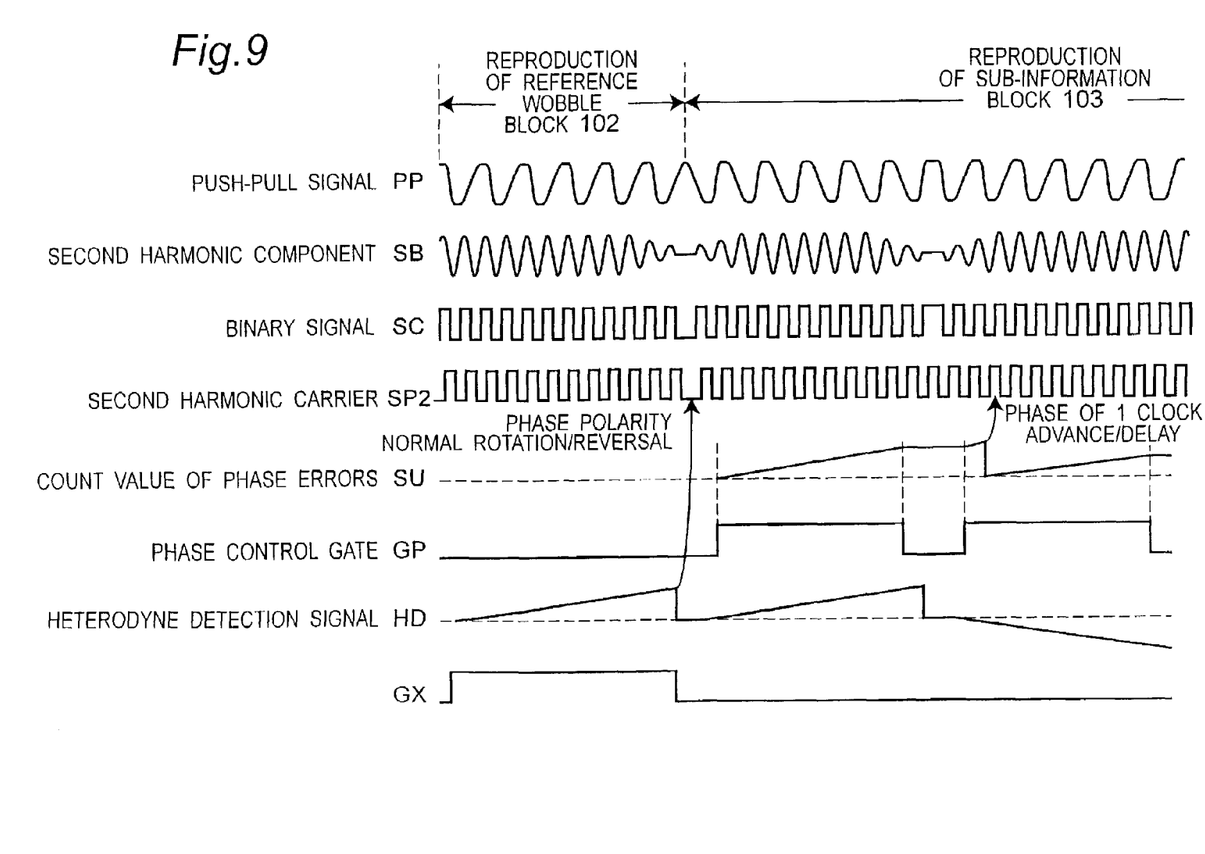
FIG. 9 is a diagram showing signal waveforms of each section utilized and generated in the sub-information detection circuit.

FIG. 8 is a block diagram showing the configuration of sub-information detection circuit 807 according to the second embodiment. FIG. 9 is a diagram showing signal waveforms of each section used and generated at sub-information detection circuit 807. Referring now to FIG. 8, sub-information detection circuit 807 includes bandpass filter 401, binarizing circuit 402, edge phase comparator 801, integrator 802, phase error judging circuit 803, phase polarity judging circuit 804, phase polarity control circuit 805, phase control circuit 407, demultiplier 408, multiplier 409, integrator 410, sample/hold circuit 411, and binarizing circuit 412. Of these, bandpass filter 401, binarizing circuit 402, phase control circuit 407, demultiplier 408, multiplier 409, integrator 410, sample/hold circuit 411, and binarizing circuit 412 have already been explained in the first embodiment and thus, description of these will be omitted here.

Edge phase comparator 801 outputs the phase error of two signals entered based on a phase control gate signal. Integrator 802 accumulates and adds phase errors, input values, from time to time. Phase error judging circuit 803 outputs a phase value used for advancing or delaying the phase clock according to the phase error. Phase polarity judging circuit 804 judges whether the second harmonic dividing converges at 0° or 180°. Phase polarity control circuit 805 performs normally rotation or reversal of an output of phase control circuit 407 according to the judged value of phase polarity. Phase polarity control circuit 805 outputs the second harmonic carrier SP.

Next description will be made on processing of sub-information detection circuit 807 carried out by each element described above. It is premised that push-pull signal generating circuit 302 (FIG. 3) has already formed a push-pull signal PP from the reflected beam of optical disc 3. In addition, clock generating circuit 304 (FIG. 3) has generated wobble clocks based on push-pull signal PP.

Same as the first embodiment, divider 408 generates signals of frequency corresponding to the second harmonic from the wobble clocks. Phase control circuit 407 gives a specified phase to the generated signal and outputs the second harmonic carrier SP1. Bandpass filter 401 extracts the second harmonic component SB according to push-pull signal PP entered to sub-information detection circuit 807. Binarizing circuit 402 converts the second harmonic component SB extracted by bandpass filter 401 into binary signal SC with phase information to output.

Successively, processing to align edges of binary signal SC and the second harmonic carrier SP1 is carried out. Edge phase comparator 801 outputs the phase error between rising edge and falling edge of binary signal SC and rising edge and falling edge of the second harmonic carrier SP1 outputted by phase control circuit 407 based on a phase control gate signal. The phase control gate signal is a signal which becomes a high level while unit block 104 of sub-information wobble block 103 is being reproduced and a low level while is it not reproduced. Integrator 802 accumulates and adds as required the phase error outputted by edge phase comparator 801.

Phase error judging circuit 803 advances the phase of phase control circuit 407 by 1 clock when the phase error accumulated and added by integrator 802 reaches a specified positive value and resets the value of integrator 802 to 0. Conversely, when the phase error reaches a specified negative value, phase error judging circuit 803 delays the phase of phase control circuit 407 by 1 clock and resets the value of integrator 802 to 0. These actions are carried out as required when the phase control gate is at section "H", that is, while the sub-information wobble is being reproduced and when the phase control gate is at section "L", the value of integrator 802 is held.

The reason why the above-mentioned processing is carried out will be discussed. Because, in the second harmonic component SB of the sub-information wobble, the phase polarity reversely changes according to "0" or "1" of the sub-information, the phase is indefinite. Therefore, regular phase error detection using, for example, each rising edge of the binary signal SC and the second harmonic carrier SP1, is unable to be carried out. In this embodiment, by comparing phases by using both rising edges and falling edges, phases from −90° to +90° or +90° to −90° (via ±180°) can be detected irrespective of "0" or "1" of the sub-information. Therefore, phases of two signals can be aligned and converged either at 0° or at 180°.

However, even if the phase of the binary signal SC is aligned with the phase of the second harmonic carrier SP1, it is unable to judge whether the phase is converged at 0° (normal rotation) or 180° (reversal). That is, it is unable to judge whether binary signal SC and the second harmonic carrier SP1 are of the same phase or reversed. Therefore, in the present embodiment, by detecting the phase polarity in advance by using wobble of reference wobble block 102 (FIG. 2), it is judged whether phases of two signals are of the same or 180° deviated.

Processing of detection of phase polarity using wobble of reference wobble block 102 is described as follows. When reproduction of reference wobble begins, phase polarity judging gate rises and heterodyne detection is carried out under the current phase condition of the second harmonic carrier SP1. In such event, the second harmonic carrier SP1 is entered into multiplier 409 via phase polarity control circuit 805 as the second harmonic carrier SP2. As a result of heterodyne detection at multiplier 409 and integrator 410, heterodyne detection signal HD is outputted and entered in phase polarity judging circuit 804. Phase polarity judging circuit 804 judges based on heterodyne detection signal HD whether the second harmonic carrier SP1 obtained by dividing is converged at 0° or 180°. In the event that phase polarity control circuit 805 judges that the second harmonic carrier SP is converged at 0° from the judgment result, phase polarity control circuit 805 provides normal rotation processing to the second harmonic carrier, and if it judges that the second harmonic carrier SP is converged at 180°, it carries out reversal processing and generates the second harmonic carrier SP2. The second harmonic carrier SP2 is again entered in multiplier 409 and heterodyne-detected by the phase polarity. According to the processing described in the first embodiment, the sub-information is outputted from binarizing circuit 412.

Note that, if in the detection of the phase polarity mentioned above, the absolute value of detection result is small, it is possible to judge that the phase control in the sub-information wobble mentioned above is indefinite or reference wobble would have some kind of defect, and therefore, the condition may be maintained irrespective of the above results. In addition, in the event that convergence by phase control is completed and the track groove is being continuously scanned, the detection result is not considered to be varied. Therefore, it is also possible to judge the phase polarity based on a plurality of detection results by judging the continuity of detection results, adding a plurality of detection results, passing low-pass filter.

As described above, the optical disc reproduction apparatus according to the second embodiment judges the phase polarity of 0° or 180° using reference wobble and self-synchronizes the detailed ±90° phase by using the sub-information wobble itself. Accordingly, it becomes possible to carry out still more precise control than the first embodiment by using a large number of information and still more performance improvement can be achieved.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for reproducing information from an information recording medium, wherein the information recording medium includes a reference wobble block which has a first wobble pattern representing a first information content, and an information wobble block which follows the reference wobble block and which has at least one of the first wobble pattern and a second wobble pattern representing a second information, wherein the first wobble pattern is represented by at least a first fundamental and a second harmonic of a Fourier series, and the second wobble pattern is represented by a first fundamental and a second harmonic of the Fourier series and the polarity of the second harmonic of the second wobble pattern is opposite the polarity of the second harmonic of the first wobble pattern, said method comprising:

reading the reference wobble block;
reading the information wobble block;
comparing a second harmonic of a Fourier series of a wobble pattern read from the information wobble block with a second harmonic of a Fourier series of the first wobble pattern of the reference wobble block;
judging that information recorded in the information wobble block is identical to the first information in a case that the phase of the second harmonic of the wobble pattern read from the information wobble block coincides with the phase of the second harmonic of the first wobble pattern, and judging that information recorded in the information wobble block is the second information in a case that the phase of the second harmonic of the wobble pattern read from the information wobble block is different from the phase of the second harmonic of the first wobble pattern; and
outputting the first information in a case that the information recorded in the information wobble block is judged to be identical to the first information in said judging, and outputting the second information in a case that the information recorded in the information wobble block is judged to be different from the first information in said judging.

2. The method according to claim 1,
wherein said comparing comprises:
generating a second harmonic carrier having frequency corresponding to the second harmonic based on a period of the first wobble pattern;
extracting a second harmonic component from a waveform obtained by reading the reference wobble block; and
comparing a phase of the second harmonic carrier with a phase of the second harmonic component to detect a phase error, and
wherein said judging comprises:
changing the phase of the second harmonic carrier based on the phase error;
newly generating a second harmonic carrier having frequency corresponding to the second harmonic based on the period of the first wobble pattern;
newly extracting a second harmonic component from a waveform obtained by reading the information wobble block;
heterodyne-detecting the second harmonic component and the second harmonic carrier to generate a first detection signal;
judging a phase polarity of the second harmonic carrier based on the first detection signal;
carrying out one of normal rotation processing and reverse processing of the second harmonic carrier based on a result of the judging of a phase polarity to newly generate a second harmonic carrier;
newly extracting a second harmonic component from a waveform obtained by reading the information wobble block;
heterodyne-detecting the newly extracted second harmonic component and the newly generated second harmonic carrier to generate a second detection signal; and
judging whether the wobble pattern of the information wobble block coincides with the first wobble pattern based on the sign of the second detection signal.

3. The method according to claim 2, wherein said comparing of the phase of the second harmonic carrier with the phase of the second harmonic component comprises comparing phases of a rising edge and a falling edge of the second harmonic carrier with phases of a rising edge and a falling edge of the second harmonic component to detect a phase error.

4. An apparatus for reproducing information from an information recording medium, wherein the information recording medium includes a reference wobble block which has a first wobble pattern representing a first information content, and an information wobble block which follows the reference wobble block and which has at least one of the first wobble pattern and a second wobble pattern representing a second information, wherein the first wobble pattern is represented by at least a first fundamental and a second harmonic of a Fourier series, and the second wobble pattern is represented by a first fundamental and a second harmonic of the Fourier series, the polarity of the second harmonic of the second wobble pattern being opposite the polarity of the second harmonic of the first wobble pattern, said apparatus comprising:

a head operable to read the reference wobble block and the information wobble block; and
an information detection circuit operable to output information recorded in the information wobble block, wherein said information detection circuit includes:
a heterodyne detector operable to heterodyne-detect a wobble pattern of the information wobble block and the first wobble pattern of the reference wobble block read by said head, and
a binarizing circuit operable to judge that information recorded in the information wobble block is identical to the first information in a case that the phase of the second harmonic of the wobble pattern read from the information wobble block coincides with the phase of the second harmonic of the first wobble pattern, judge that information recorded in the information wobble block is the second information in a case that the phase of the second harmonic of the wobble pattern read from the information wobble block is different from the phase of the second harmonic of the first wobble pattern, and output the first information in a case that the information recorded in the information wobble block is judged to be identical to the first information in said judging, and output the second information in a case that the information recorded in the information wobble block is judged to be different from the first information in said judging.

5. A method for controlling reproduction of information from an information recording medium, wherein the information recording medium includes a reference wobble block which has a first wobble pattern representing a first information content, and an information wobble block which follows the reference wobble block and which has at least one of the first wobble pattern and a second wobble pattern representing a second information, wherein the first wobble pattern is represented by at least a first fundamental and a second harmonic of a Fourier series, and the second wobble pattern is represented by a first fundamental and a second harmonic of the Fourier series, the polarity of the second harmonic of the second wobble pattern being opposite the polarity of the second harmonic of the first wobble pattern, said method comprising:
instructing to read the reference wobble block;
instructing to read the information wobble block;
comparing a second harmonic of a Fourier series of a wobble pattern read from the information wobble block with a second harmonic of a Fourier series of the first wobble pattern of the reference wobble block;
judging that information recorded in the information wobble block is identical to the first information in a case that the phase of the second harmonic of the wobble pattern read from the information wobble block coincides with the phase of the second harmonic of the first wobble pattern, and judging that information recorded in the information wobble block is the second information in a case that the phase of the second harmonic of the wobble pattern read from the information wobble block is different from the phase of the second harmonic of the first wobble pattern; and
outputting the first information in a case that the information recorded in the information wobble block is judged to be identical to the first information in said judging, and outputting the second information in a case that the information recorded in the information wobble block is judged to be different from the first information in said judging.

6. A computer readable medium embodied with a computer program, for controlling reproduction of information from an information recording medium, wherein the information recording medium includes a reference wobble block which has a first wobble pattern representing a first information content, and an information wobble block which follows the reference wobble block and which has at least one of the first wobble pattern and a second wobble pattern representing a second information, wherein the first wobble pattern is represented by at least a first fundamental and a second harmonic of a Fourier series, and the second wobble pattern is represented by a first fundamental and a second harmonic of the Fourier series, the polarity of the second harmonic of the second wobble pattern being opposite the polarity of the second harmonic of the first wobble pattern, said program causing a computer to:
read the reference wobble block;
read the information wobble block;
compare a second harmonic of a Fourier series of a wobble pattern read from the information wobble block with a second harmonic of a Fourier series of the first wobble pattern of the reference wobble block;
judge that information recorded in the information wobble block is identical to the first information in a case that the phase of the second harmonic of the wobble pattern read from the information wobble block coincides with the phase of the second harmonic of the first wobble pattern, and judge that information recorded in the information wobble block is the second information in a case that the phase of the second harmonic of the wobble pattern read from the information wobble block is different from the phase of the second harmonic of the first wobble pattern; and
output the first information in a case that the information recorded in the information wobble block is judged to be identical to the first information in said judging, and output the second information in a case that the information recorded in the information wobble block is judged to be different from the first information in said judging.

7. An apparatus for controlling reproduction of information from an information recording medium, wherein the information recording medium includes a reference wobble block which has a first wobble pattern representing a first information content, and an information wobble block which follows the reference wobble block and which has at least one of the first wobble pattern and a second wobble pattern representing a second information, wherein the first wobble pattern is represented by at least a first fundamental and a second harmonic of a Fourier series, and the second wobble pattern is represented by a first fundamental and a second harmonic of the Fourier series, the polarity of the second harmonic of the second wobble pattern being opposite the polarity of the second harmonic of the first wobble pattern, said apparatus comprising:
an information detection circuit operable to output information recorded in the information wobble block, wherein said information detection circuit includes:
a heterodyne detector operable to heterodyne-detect a wobble pattern of the information wobble block and the first wobble pattern of the reference wobble block read by said head, and
a binarizing circuit operable to judge that information recorded in the information wobble block is identical to the first information in a case that the phase of the second harmonic of the wobble pattern read from the information wobble block coincides with the phase of the second harmonic of the first wobble pattern, judge that information recorded in the information wobble block is the second information in a case that the phase of the second harmonic of the wobble pattern read from the information wobble block is different from the phase of the second harmonic of the first wobble pattern, and output the first information in a case that the information recorded in the information wobble block is judged to be identical to the first information in said judging, and output the second information in a case that the information recorded in the information wobble block is judged to be different from the first information in said judging.

* * * * *